(12) United States Patent
Morison et al.

(10) Patent No.: US 6,870,975 B1
(45) Date of Patent: Mar. 22, 2005

(54) FIBER OPTIC SENSOR USABLE OVER WIDE RANGE OF GAGE LENGTHS

(75) Inventors: W. Don Morison, Mississauga (CA);
Gerald Manuelpillai, Ajax (CA);
Roderick C. Tennyson, Toronto (CA);
Thierry Cherpillod, Maple (CA);
Dominic Rouse, Toronto (CA)

(73) Assignee: Fiber Optic Systems Technology, Inc., West Chester, PA (US)

( * ) Notice: Subject to any disclaimer, the term of this patent is extended or adjusted under 35 U.S.C. 154(b) by 173 days.

(21) Appl. No.: 09/987,436

(22) Filed: Nov. 14, 2001

(51) Int. Cl.$^7$ .............................. G02B 6/00; G01B 9/02
(52) U.S. Cl. .............................. 385/12; 385/13; 385/88; 356/480
(58) Field of Search ............................ 385/12–13, 51, 385/88–90, 70–73, 76–84, 55; 250/227.14–227.19; 73/653, 655, 657, 661–662, 800–801; 356/480–481, 35.5, 519

(56) References Cited

U.S. PATENT DOCUMENTS

| | | | |
|---|---|---|---|
| 4,443,700 A | 4/1984 | Macedo et al. | |
| 4,671,659 A | 6/1987 | Rempt et al. | |
| 4,749,246 A | 6/1988 | Epworth et al. | |
| 4,755,668 A | 7/1988 | Davis | |

(List continued on next page.)

FOREIGN PATENT DOCUMENTS

| | | |
|---|---|---|
| EP | 0357 253 A2 | 3/1990 |
| EP | 0 401 576 B1 | 7/1993 |
| EP | 0 499 545 B1 | 4/1995 |
| EP | 0 727 640 A2 | 8/1996 |
| EP | 0 727 640 A3 | 8/1996 |
| EP | 0 708 913 B1 | 4/1998 |
| EP | 0 840 091 A2 | 5/1998 |
| GB | 2 262 803 A | 6/1993 |
| JP | 62242805 | 10/1987 |
| JP | 01307621 A | 12/1989 |
| JP | 10267707 A | 10/1998 |
| WO | WO 95/02802 | 1/1995 |
| WO | WO 99/22265 | 5/1999 |
| WO | WO 99/60360 | 11/1999 |
| WO | WO 00/00799 | 1/2000 |
| WO | WO/00/00799 | 1/2000 |
| WO | WO 00/39532 | 7/2000 |

OTHER PUBLICATIONS

Application of Optical Fiber Sensor in Civil Structural Monitoring, Daniele Inaudi, Smartec SA, 2001, proceedings of SPIE vol. 4328 (2001) pp. 1–10.

*Primary Examiner*—Frank G. Font
*Assistant Examiner*—Michael P. Mooney
(74) *Attorney, Agent, or Firm*—Blank Rome LLP

(57) ABSTRACT

A fiber optic sensor includes two reflective elements in series. The first reflective element is formed as a partially mirrored surface on the end of a single-mode optical fiber lead which is bonded into a ferrule. A sleeve is used to join the ferrule to a second ferrule which is turn is bonded to a length of single-mode optical fiber. The second reflective element is a partially mirrored surface on the cleaved end of the second fiber. The second fiber may be affixed to or embedded in a structure to be monitored and changes its optical path length in response to a condition of the structure. Light introduced into the sensor is reflected from the first or second reflective element and thus follows two optical paths. The path length difference between the two optical paths is twice the optical path length of the second fiber.

9 Claims, 4 Drawing Sheets

U.S. PATENT DOCUMENTS

| | | |
|---|---|---|
| 5,012,088 A | 4/1991 | Cole et al. |
| 5,095,514 A | 3/1992 | Curtis |
| 5,218,197 A | 6/1993 | Carroll |
| 5,363,463 A | 11/1994 | Kleinerman |
| 5,394,488 A | 2/1995 | Fernald et al. |
| 5,420,688 A | 5/1995 | Farah |
| 5,444,803 A | 8/1995 | Kim et al. |
| 5,473,432 A | 12/1995 | Sorin ........................ 356/479 |
| 5,557,400 A | 9/1996 | Sorin et al. ................. 356/73.1 |
| 5,596,409 A | 1/1997 | Marcus et al. .............. 356/479 |
| 5,657,405 A | 8/1997 | Fujiwara |
| 5,698,848 A * | 12/1997 | Belk ..................... 250/227.11 |
| 5,721,615 A | 2/1998 | McBride et al. |
| 5,909,273 A | 6/1999 | Malvern |
| 5,991,479 A | 11/1999 | Kleinerman |
| 6,289,143 B1 * | 9/2001 | Berthold et al. .............. 385/12 |

* cited by examiner

FIBER OPTIC SENSOR USABLE OVER WIDE RANGE OF GAGE LENGTHS

FIELD OF THE INVENTION

The present invention is directed to a fiber optic sensor for sensing deflections, displacements, or other physical conditions and more particularly to such a sensor which may have a gage length from less than 10 cm to over 100 m.

DESCRIPTION OF RELATED ART

The use of optical fibers to sense deflections, displacements, temperatures and other physical conditions is well known. Typically, such sensors operate by interferometry. An interferometric fiber optic sensor, in its simplest form, operates by splitting light from a light source into two different paths and subsequently recombining the two components, by a suitable optical technique, to produce an interference fringe whose properties are related to the quantity being measured by the sensor. The change in path length difference or time of flight for the two components of the light produced by elongation or contraction of the sensor can readily be discriminated to better than the coherence length of the light source, provided that an external monitoring system is capable of measuring a matching path length difference.

However, the simplest form of such a sensor has the following drawbacks. First, while it can, in principle, detect a quantity of the physical condition, it is often required to measure the physical condition over a long distance or gage length. For example, if a measurement of the pressure or temperature over an extended area is desired, then the simplest form of the sensor cannot provide the information. Second, the range of phase differences must fall within $2\pi$; otherwise, the resulting phase ambiguity renders the detection ambiguous.

To overcome the first drawback, various forms of multiplexing are known. For example, U.S. Pat. No. 4,443,700 to Macedo et al teaches an optical sensing apparatus with multiple sensing fibers spaced along its length. Signals from the multiple sensing fibers are distinguished by their time delays. However, it is necessary to resolve such time delays on the order of nanoseconds, thus complicating the device and not providing a truly integrated average of the measurand (the quantity to be measured) over the sensor length.

To overcome the second drawback, U.S. Pat. No. 5,721,615 to McBride et al teaches a fiber optic sensor having a sensor arm and a reference arm. The reference arm has a device having a microscope stage for varying a path difference between the sensor and reference arms. An interferogram is generated when the path lengths are equal. However, fairly complicated mathematics are used to calculate strain and temperature from the group delay and dispersion.

Smartec SA of Manno, Switzerland, advertises a technology for fiber optic interoferometric measurement known as SOFO. Two optical fibers are installed in the pipe or other structure to be monitored; the first is in mechanical contact with the structure to expand or contract therewith and functions as a sensing fiber, while the second is free and functions as a reference fiber. An analyzer for use with such a sensor also has two optical fibers, one of which has a movable mirror to adjust its optical path length. A modulated signal is obtained only when the difference in optical path lengths between the two fibers in the structure is compensated by the difference in optical path lengths between the two fibers in the analyzer to better than the coherence length of the light source. However, the SOFO system introduces an undesirable complexity in that two fibers must be present in the structure to be monitored. Also, the active length of the fiber is in the range of 0.25–10 m (standard) or 10–30 m (special order).

SUMMARY OF THE INVENTION

It will be readily apparent from the above that a need exists in the art for a simple way to overcome the above-noted problems with the prior art. It is therefore a primary object of the invention to provide a fiber optic sensor capable of accurately measuring average dimensional changes or other physical quantities over various gage lengths.

It is another object of the invention to provide a fiber optic sensor in which a separate reference fiber is not required to be installed in the structure to be monitored.

To achieve the above and other objects, the present invention is directed to a fiber optic sensor incorporating two reflective elements. The first reflective element provides a fixed optical path length, while the second provides an optical path length which is equal to the sensor gage length and which is capable of varying directly with the measurand.

In a preferred embodiment, the first reflective element is formed as a partially mirrored surface on the end of a single-mode optical fiber lead which is bonded into a ceramic ferrule. In the preferred embodiment, the reflectivity of this partial mirror should be approximately 3%. A ceramic sleeve is used to join the ferrule to a second ferrule which is turn is bonded to a length of single-mode optical fiber. The second reflective element is a partially mirrored surface, which in the preferred embodiment has a reflectivity of approximately 24%, on the cleaved end of the second fiber. The second length of optical fiber may be affixed to or embedded in a structure to be monitored and forms the gage length of the sensor.

Light sent into the sensor through the lead fiber is reflected from the two partially mirrored surfaces and returned to an analyzer for demodulation. The spacing or gap between the two ferrules is adjusted to provide the optimal light signal to the analyzer. As is well known in the art, the optimal light signal is such that that the light returned to the instrument by all reflecting elements is of equal intensity so as to maximize the interferometric signal. In the preferred embodiment, the gap is adjusted mechanically between 25–200 microns.

The invention permits the realization of a fiber optic interferometric sensor of any arbitrary length for measuring deflections, displacements or other physical quantities. The sensor can include a single optical fiber bonded to, attached at discrete points to or embedded in a structure of any shape or configuration. Alternatively, the fiber can be fixed at both ends, with no continuous attachment to the structure. The fiber can be installed in a pre-tensioned state if it is anticipated that the structure may contract.

Many such fiber optic sensors, acting as individual strain sensors, can be optically coupled to a single backbone fiber, provided that the optical path lengths of the sensors are different so as to provide a spatial division multiplexing capacity. By contrast, the SOFO system requires an optical switch for multiplexing.

An optical source of short coherence length (such as a light emitting diode) produces a broadband light beam that, when introduced into the fiber optic sensor, allows resolution of displacements or other physical quantities averaged along the sensor gage length to better than the coherence length of the source. A technique is disclosed for demodulation of the signal; however, any other suitable techniques in low-coherence interferometry, such as those known in the art, may be used.

Application examples include, but are not limited to, surface bonding the sensors to pipes, pressure vessels, bridge structures of steel or concrete, or embedding the sensors in concrete or polymer composites. In these embodiments, the sensors can measure displacements from any source in the form of elongation or contraction, which can be converted to strains in tension or compression. Additional examples include bonding sensors to long pipelines to measure changes in geometry due to factors such as cracks or leaks, wall thinning due to corrosion, and buckling due to adverse loads; bonding sensors to monitor movement of large structures such as dams, due to movement in the earth or concrete foundation, and vibration and creep behavior of bridges and buildings.

The sensors according to the present invention can be used, e.g., in applications where the gage length of interest is on the order or tens of meters, where electrical sensors are too short to provide accurate average displacements without the use of numerous sensors or where electrical sensors provide a hazard, such as in explosive environments, e.g., mines, gas pipelines and oil wells.

BRIEF DESCRIPTION OF THE DRAWINGS

A preferred embodiment of the present invention will be described in detail with reference to the drawings, in which.

DETAILED DESCRIPTION OF THE PREFERRED EMBODIMENTS

Figure 1A:
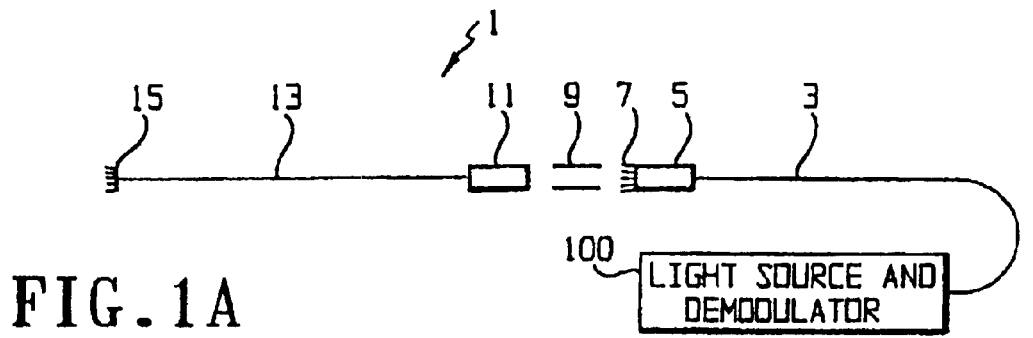
FIGS. 1A and 1B show a schematic diagrams used for explaining principles of operation of the preferred embodiment.

A preferred embodiment of the present invention will be described in detail with reference to the drawings, in which like reference numerals refer to like elements throughout.

FIG. 1A shows a schematic diagram of the sensor according to the preferred embodiment. The sensor 1 includes a lead fiber 3, preferably a single-mode optical fiber, terminated by a lead ceramic ferrule 5 and a lead mirror 7 formed as a partially mirrored surface on the end of the lead fiber 3. A ceramic sleeve 9 is used to attach the ferrule 5 to another ceramic ferrule 11, which is in turn attached to a sensor fiber 13, which is also preferably a single-mode optical fiber. The sensor fiber 13 ends in a sensor mirror 15, which, like the lead mirror 7, is formed as a partially mirrored surface on the end of the sensor fiber 13. The sensor 1 is connected to an instrument 100 which functions as both a light source and a demodulator.

The sensor 1 is installed such that a change in a physical condition (e.g., deformation) of a structure affects the optical path length of the sensor fiber 13, but not that of the lead fiber 3. Thus, light introduced from the instrument 100 into the sensor 1 takes one of two paths: one from the instrument 100 to the lead mirror 7 and back, and the other from the instrument 100 to the sensor mirror 15 and back. The two paths differ in their optical path lengths by twice the optical path length of the sensor fiber 13. Thus, detection of a change in the optical path lengths provides a determination of the change in the optical path length of the sensor fiber 13 and thus of the physical condition of the structure. Accordingly, the optical path length of the sensor fiber 13 is the gage length of the sensor 1.

The sensor 1 can be connected to any suitable light source and demodulation system. A preferred light source and demodulation system will be explained in detail with reference to the block diagram of FIG. 1B and the flow chart of FIG. 2. In the instrument 100 of FIG. 1B, light having a short coherence length exits a light emitting diode (LED) 102 and travels via an optical fiber 104 having an optical path length A to a 50/50 coupler 106. The coupler 106 splits the light in two, such that fifty percent of the light is directed through an optical fiber 108 and ultimately discarded and the other fifty percent is directed through the lead fiber 3 of the sensor 1.

The light travels along the lead fiber 3 and through a connector 112 and encounters the lead mirror 7. The optical path length up to the lead mirror 7 is B, which, as noted above, is constant. The lead mirror 7 reflects a portion (e.g., 3%) of the light back through the lead fiber 3 and transmits the remainder of the light along the sensor fiber 13, where it encounters the sensor mirror 15 separated from the lead mirror 7 by an optical path length C, which, as noted above, defines the gage length of the sensor 1. Thus, the light returning along the sensor 1 has two components whose optical path lengths are 2B and 2B+2C, respectively; that is, they differ by 2C.

As noted above, the optical path length C varies in accordance with a value of the physical condition. The goal is to determine C and thus the quantity of the physical condition.

Both of those components of the light pass again through the coupler 106. Fifty percent of the light travels toward the LED 102, where it is lost. The other fifty percent travels along an optical fiber 118 having an optical path length D to a second 50/50 coupler 120, which divides the light between an optical fiber 122 having an optical path length E and an optical fiber 124 having an optical path length F.

The optical fiber 122 is called the adjustable-length optical fiber because the optical path length E of the optical fiber 122 is controllable. In some embodiments, the optical path length E is changed by changing the physical length of the fiber 122. For instance, the fiber 122 can be stretched between an anchor 126 and an actuator 128. Other techniques for changing the optical path length E will be described below. The optical fiber 122 ends with a mirror 130, so that the light passing through the fiber 122 travels by an optical path length 2E. The total variation in E is greater than the coherence length of light from the light source.

The optical fiber 124 is called the passive reference fiber because its optical path length F is fixed and is used as a reference value in the determination of C. Since the optical fiber 124 ends with a mirror 134, the light passing through the fiber 124 travels by an optical path length 2F. The fiber 124 can also include a connector 134, which should preferably have optical characteristics identical to those of the connector 112.

The light reflected by the mirrors 130 and 132 is recombined in the coupler 120. The recombined light travels through an optical fiber 136 having an optical path length G to a photodetector 138.

The sensor 1 and the instrument 100 provide four possible paths for the light emitted by the LED 102, since the light can be reflected from the mirror 7 or 15 and then from the mirror 130 or 132. The first path involves the mirrors 7 and 130 and has an optical path length A+2B+D+2E+G. The second path involves the mirrors 15 and 130 and has an optical path length A+2C+2B+D+2E+G, or the first optical path length plus 2C. The third path involves the mirrors 7 and 132 and has an optical path length A+2B+D+2F+G. The fourth path involves the mirrors 15 and 132 and has an optical path length A+2B+2C+D+2F+G, or the third optical path length plus 2C.

The terms A+2B+D+G are common to all four paths. If those terms are eliminated, the remaining terms are:

First path, 2E
Second path, 2C+2E
Third path, 2F
Fourth path, 2C+2F.

Thus, the goal becomes that of deriving changes in C from the known quantity F and the controllable quantity E.

Only the second and third paths are involved in producing an interference fringe at the photodetector 138. The interference fringe is maximized when those path lengths become equal, namely, when 2C+2E=2F, or 2C=2F−2E. The adjustable length optical fiber 122 is adjusted until that condition is reached, as determined by observation of the interference fringe detected by the photodetector 138. Then, changes in C can be derived from the fixed quantity F and the value of E needed to maximize the interference fringe:

$$C=F-E \quad (Eq.\ 1)$$

In other words, the actuator 128 is actuated until the difference in path lengths between the mirrors 130 and 132 equals the difference in path lengths between the mirrors 7 and 15.

Figure 2:
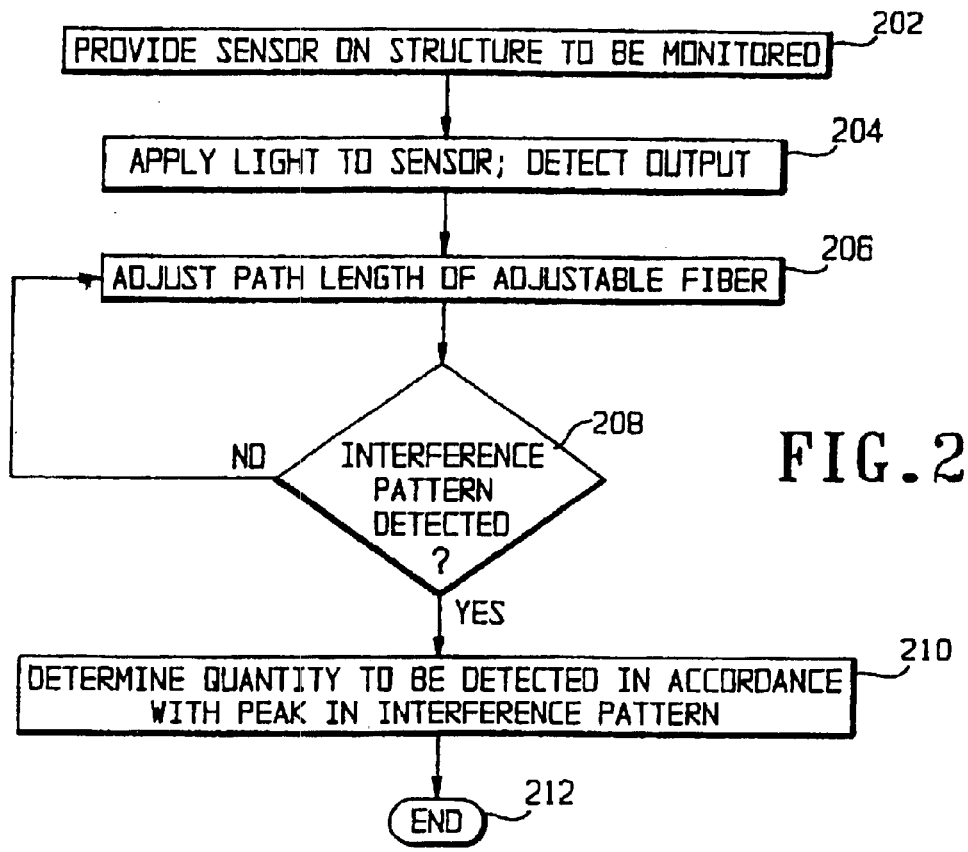
FIG. 2 shows a flow chart used for explaining the principles of operation of the preferred embodiment.

For instance, when the sensing fiber 13 is bonded to a structure (FIG. 2, step 202), it will be at a rest position in which C has an initial value LS1. As the structure deforms, C reaches a new value LS2. In other words, the sensing fiber 13 experiences a displacement LS2−LS1. Similarly, when the adjustable fiber 122 is in its rest position, the difference F−E between the optical path lengths of the fibers 124 and 122 has an initial value LR1. During sensing, light is applied to the fibers 3, 13, 122 and 124 (FIG. 2, step 204), and an output is detected at the photodetector 138. The actuator 128 adjusts the optical path length of the fiber 122 (FIG. 2, step 206) until the interference fringe is detected (FIG. 2, step 208). The interference fringe is maximized when the path difference between the fibers 124 and 122 reaches a new value LR2 which is equal to LS2. Then, in FIG. 2, step 210, C can easily be determined. Then the sensing process ends in step 212.

Figure 1B:
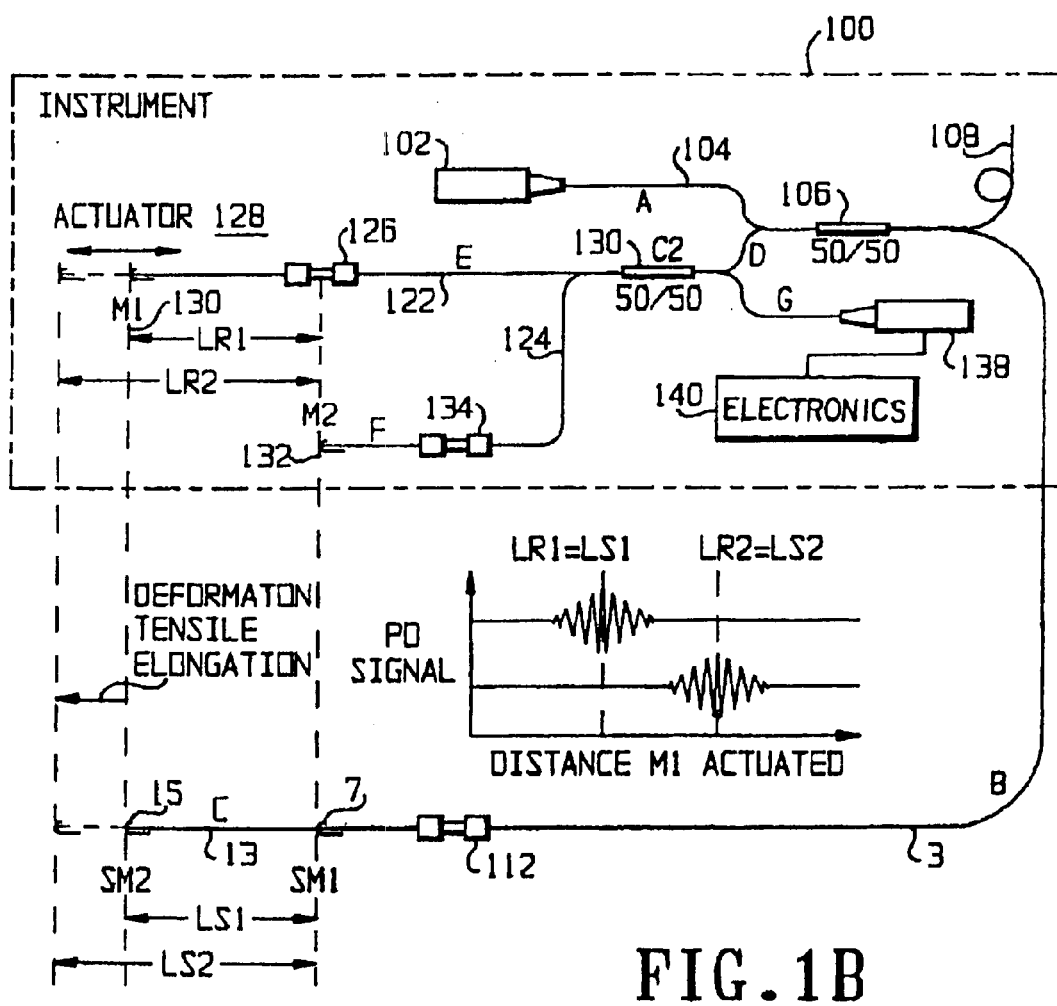

FIG. 1B also shows a plot of the signal output by the photodetector 138, showing the resultant interference fringes.

The above is easily generalized to a sensor having multiple sensing fibers with path lengths C, C1, C2, etc. A single adjustable fiber and a single reference fiber can be used, and as the adjustable fiber is adjusted, a series of interference fringes will appear, one for each of the multiple sensing fibers. The fringes have peaks when LR2−LR1=0, C1−C, C2−C, ... If those peaks occur in mutually exclusive ranges, spatial division multiplexing is possible, and the various sensing fibers can be resolved without the need in the prior art to resolve nanosecond differences in time between pulses or to provide an optical switch to select a signal from one of the sensors.

The sensor 1, in combination with the instrument 100 or another suitable instrument, can be used to detect static or dynamic conditions. For dynamic conditions, the frequency which can be detected is limited only by the time needed to adjust the adjustable fiber.

The optical fibers are preferably single-mode fibers to reduce losses. The actuator 128 has a suitable way of determining the degree of actuation so that E can be determined. For example, if the actuator 128 is mechanical, a mechanical encoder can be used, while if the actuator 128 is piezoelectric, E can be derived from the voltage required to maximize the interference fringe.

Any suitable electronics 140 can be used to receive the signals from the photodetector and locate the interference maximum. The electronics can locate the maximum automatically or operate under manual control.

The sensor 1 can be implemented as a long-gage optical fiber sensor. The sensor 1 can be placed in or on an object whose physical condition (e.g., displacement) is to be sensed.

Figure 3A:
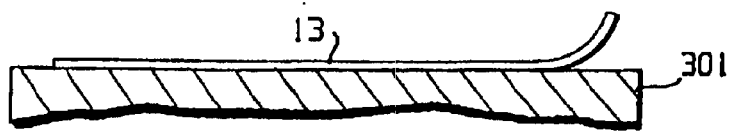
FIGS. 3A–3C show various installations of the sensing optical fiber of the preferred embodiment.
Figure 3B:
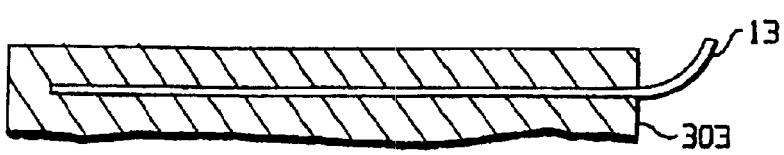
Figure 3C:
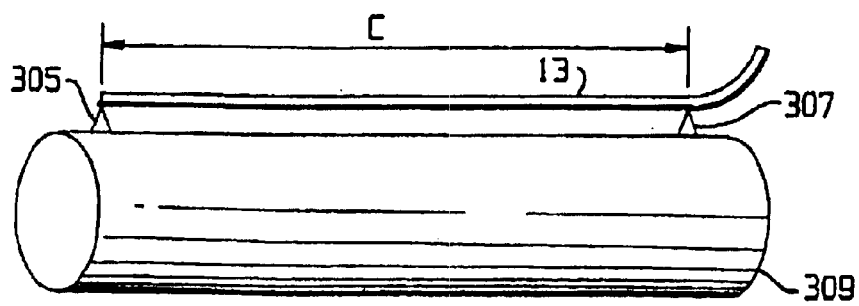

FIGS. 3A–3C show some examples. In FIG. 3A, the sensing fiber 13 is bonded to the exterior of a structure 301. As the structure 301 degrades over time, the sensing fiber 13 experiences a displacement. In FIG. 3B, the sensing fiber 13 is embedded in a structure 303, such as a dam. In FIG. 3C, the sensing fiber 13 is attached to two anchors 305, 307 on a structure 309, but is otherwise free from the structure 309. The distance between the anchors 305 and 307 defines the gage length C of the fiber 13. In any of FIGS. 3A–3C, the fiber 13 can be positioned in a pre-tensioned state such that contraction does not cause the fiber 13 to collapse if it is anticipated that a contraction of the structure 301, 303 or 309 may have to be detected.

Figure 4A:
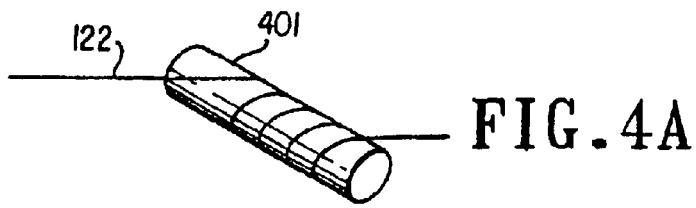
FIGS. 4A and 4B show two actuators for varying the optical path length of the adjustable length optical fiber.
Figure 4B:
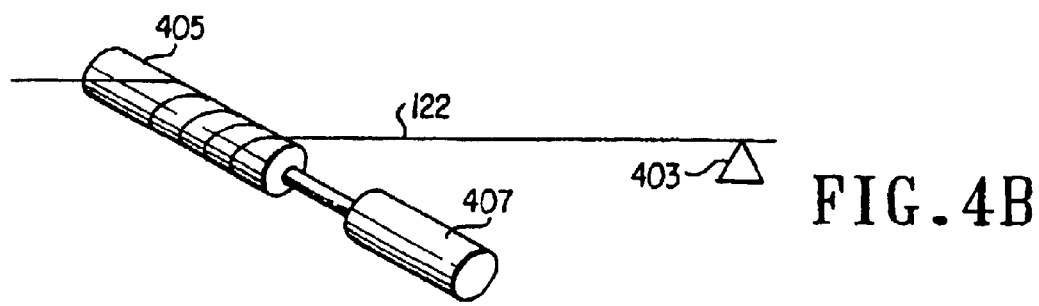

The gage length of the fiber 13 typically varies from less than ten centimeters to over a hundred meters. To permit measurements over such a gage length, the adjustable length optical fiber 122 (not shown in FIGS. 3A–3C) can be adjusted in any of several ways. For example, as shown in FIG. 4A, the fiber 122 is wrapped around a piezoelectric cylinder 401 which can be actuated to expand. Alternatively, as shown in FIG. 4B, the fiber 122 is suspended between an anchor 403 and a pulley 405 controlled by a motor 407. Other actuators, such as a linear motor, could be used instead.

The maximum displacement which the sensor can measure is determined by the length of the adjustable fiber 122 and the tensile breaking strength, i.e., the maximum strain or displacement which the fiber 122 can undergo. The longer the optical fiber, the greater the magnitude of the displacement for a given ultimate strain for the fiber material. For example, a typical single-mode optical fiber three meters in length has a maximum displacement of 60 mm. The rate at which the adjustable optical fiber 122 can be stretched or contracted determines the capacity of the sensor to measure dynamic displacement profiles.

The sensor can be modified to include multiple sensing fibers whose signals can be resolved through spatial division multiplexing. Each of the sensing fibers can be a long-gage fiber and can be used as in the first preferred embodiment. As an alternative, short gage lengths, such as a few centimeters, can be used. A single sensor can incorporate sensing fibers having long and short gage lengths.

Figure 5A:
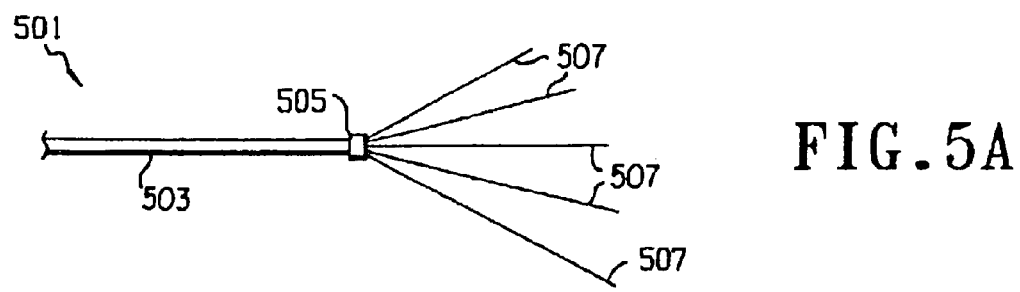
FIGS. 5A and 5B show two configurations of multiple sensing fibers.
Figure 5B:
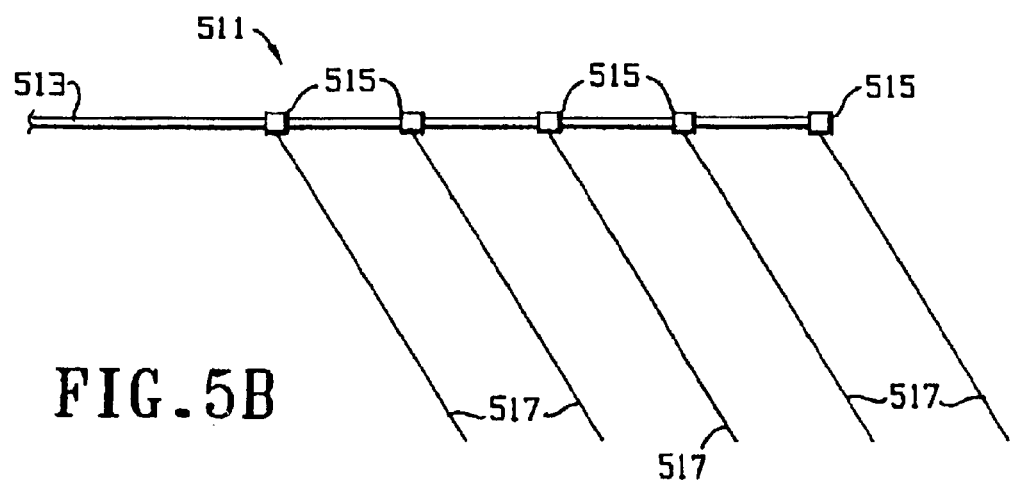

Two configurations of sensing optical fibers are shown in FIGS. 5A and 5B. FIG. 5A shows a configuration 501 in which a backbone optical fiber 503 is coupled through a coupler 505 to multiple sensing fibers 507 having different optical path lengths determined in a manner to be described shortly. FIG. 5B shows a configuration 511 in which a backbone optical fiber 513 is coupled through couplers 515 along its length to multiple sensing fibers 517. In the configuration 511, the spacing between adjacent ones of the couplers 515 supplies an optical path difference which can be used in multiplexing. Still other configurations could be devised; for example, a single optical fiber could have multiple semi-reflecting mirrors spaced along its length so that the interval between each two adjacent ones of the mirrors serves as a sensor. In either of the configurations, the coupler or couplers should provide some back reflection of the light, so that they either incorporate or take the place of the lead mirror 7. The sensing fibers 507 or 517 can be configured like the sensor fiber 13, ending in mirrors like the sensor mirror 15.

In the configuration of FIG. 5A, the sensing fibers 507 should have different optical path lengths, so that as the length of the adjustable length optical fiber 122 is adjusted, the interference fringes produced by light from the various sensing fibers 507 will not coincide or overlap. Thus, the values of the physical condition detected by the various sensing fibers 507 can be distinguished by spatial division multiplexing, so that neither time resolution on the order of a few nanoseconds nor an optical switch is required as in the prior art. In the configuration of FIG. 5B, the separation of the couplers 515 provides the necessary difference in optical path lengths.

Test data from a sensor made in accordance with an embodiment of the present invention will now be set forth. The test data demonstrate the ability of the sensor to measure deformations in a pipe, such as pre-buckling, buckling, internal pressure in the axial and circumferential directions and plastic deformations caused by loads exceeding the yield stress of the steel from which the pipe is made. Three sensor lengths are used: 10 cm, 1 m and 10 m. In addition, the ability of a long spiral wrap sensor is proved in terms of its ability to measure pressure loads in pipes.

The geometry and material properties of the steel pipe tested and the loads under which it was tested are set forth in the following table:

| Test loads applied to steel pipe | |
|---|---|
| Internal pressure (p) | 1550~1560 PSI |
| Axial compression (P) | $6 \times 10^5$~$8 \times 10^5$ lbs |
| Bending moment (M) | $3 \times 10^6$~$14 \times 10^6$ in-lbs |
| Steel pipe properties | |
| Length | ~72 in |
| Diameter | 19.4 in |
| Thickness | 0.46 in |
| Modulus of elasticity | $30 \times 10^6$ PSI |
| Poisson's ratio | 0.30 |

The following table summarizes the strains measured by two different lengths of fiber optic sensors: 1 m and 10 m (spiral wrap) under two different load conditions involving combinations of internal pressure and axial compression. The data show a good agreement with theoretical predictions based on well known stress/strain equations for pipes under those load conditions. The data show that both tension and compression can be accurately measured using the sensors under different load conditions.

| | Test results of internal pressure and axial compression | | | | |
|---|---|---|---|---|---|
| | Axial strain ($10^{-6}$) | | Circumferential strain ($10^{-6}$) | | Spiral gages Strain ($10^{-6}$) |
| Load | Predicted | 1.0 m avg | Predicted | 1.0 m avg | 10 m avg |
| P = 1547 PSI P = 12780 lbs | +202 | +258 | +929 | +934 | +933 |
| P = 1547 PSI P = $6 \times 10^5$ lbs | −500 | −471 | +1140 | +943 | n/a |

In the above data, a positive (+) value indicates tension, while a negative (−) value indicates compression. The spiral gages measure primarily circumferential strain.

Figure 6:
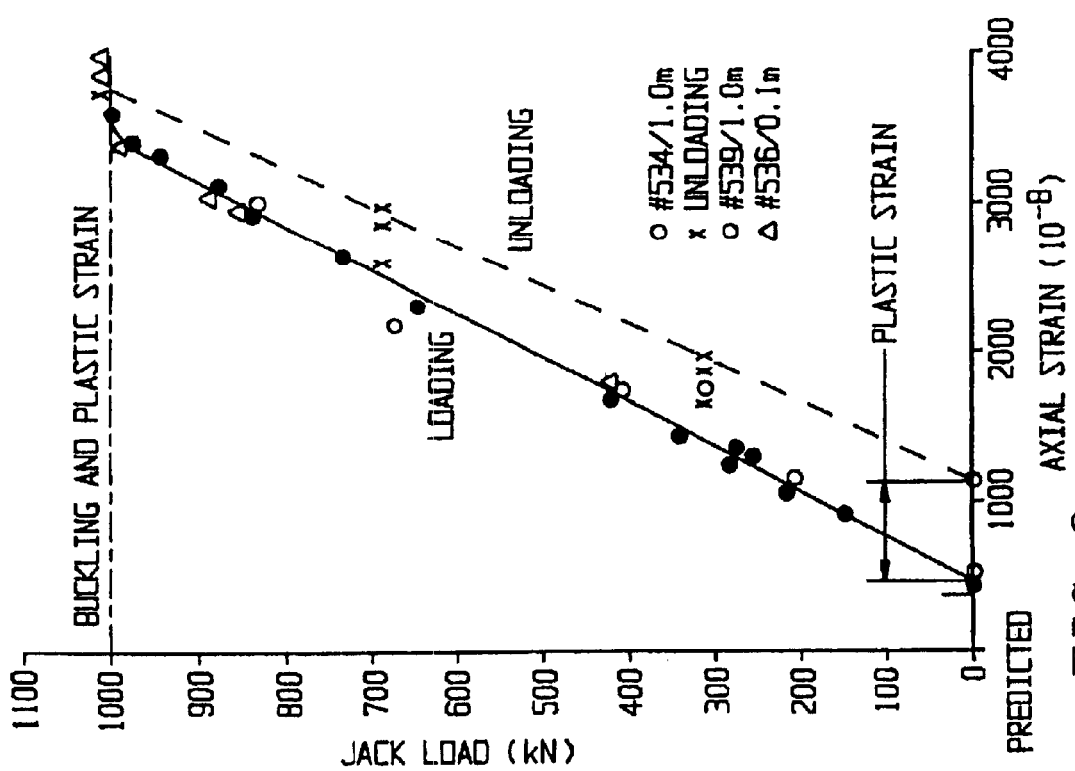

FIG. 6 shows a graph of data collected from two sensor lengths (1 m and 10 cm) measuring strains in the axial (longitudinal) direction of a pipe which is under internal pressure of 1547~1558 PSI and a pre-load of axial compression of 2690~3580 kN. The strains are plotted as a function of jack loads, i.e., a measure of the bending load applied to the pipe. The results show linear elastic behavior up to buckling, i.e., local collapse of a portion of the cylinder wall, associated with high compressive axial stresses due to the pre-load and jack-induced bending load. The results also show that upon unloading of the jack load, there was a permanent plastic deformation in the pipe, located in the buckled region.

Figure 7:
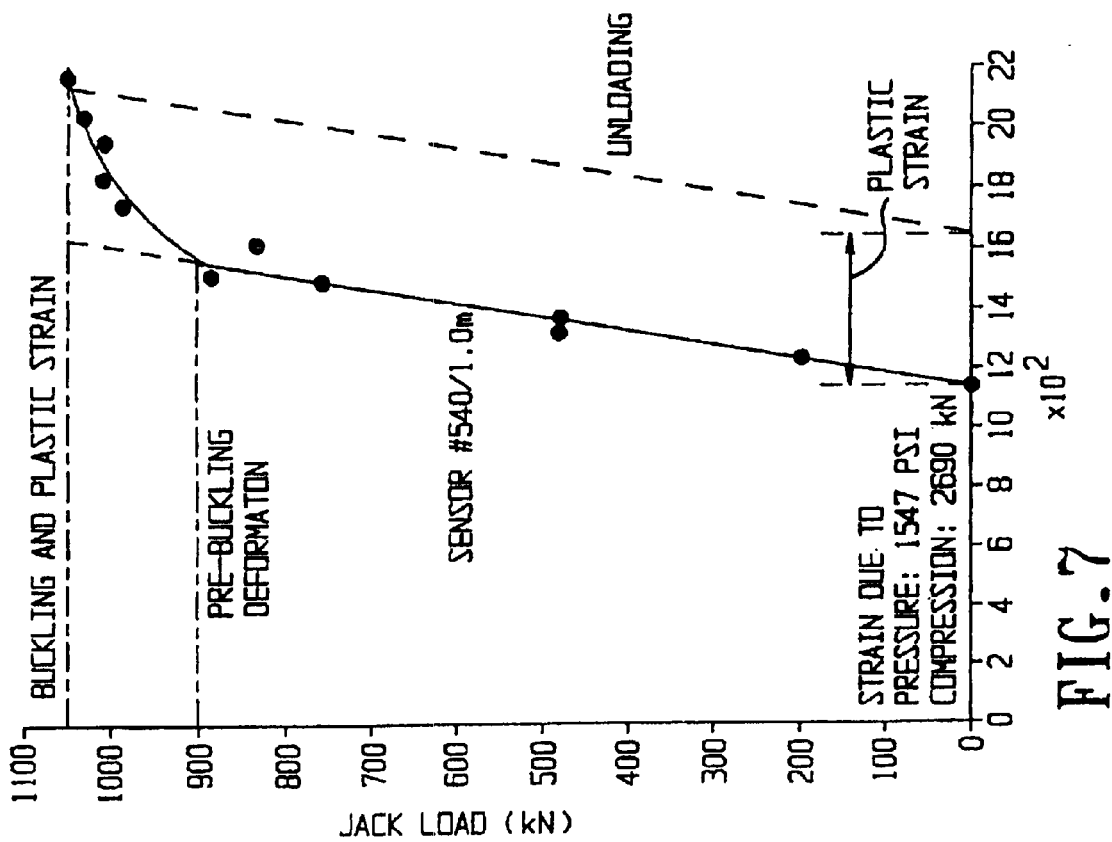
FIGS. 6 and 7 show graphs of experimental data.

FIG. 7 shows the hoop strain, i.e., the tensile strain in the circumferential direction, as measured by a 1 m sensor on a pipe which is under preloads of internal pressure and axial compression. The strain is plotted as a function of the jack load. Once again, the data show linear elastic behavior up to the buckling of the pipe. As the jack load is removed, the pipe evinces plastic deformation at the buckle location.

While a preferred embodiment and variations thereon have been described above in detail, those skilled in the art who have reviewed the present disclosure will readily appreciate that other embodiments can be realized within the scope of the present invention. For example, the sensor 1 can be used with any instrument capable of determining the optical path length C. Also, the mirrors 7 and 15 can have any suitable structure and composition, and the lead and sensor fibers can be connected through any suitable optical coupling. Therefore, the present invention should be construed as limited only by the appended claims.

We claim:

1. A fiber optic sensor for detecting a change in displacement due to mechanical, thermal or other conditions, the fiber optic sensor comprising:

a lead fiber having a first end with a connector for connecting the lead fiber to an interferometric demodulation instrument and a second end having a first ferrule with a partially reflective surface having a reflectivity of approximately 3%;

a sensor fiber having a first end with a partially reflective surface and a second end having a second ferrule with a partially reflective surface having a reflectivity of approximately 24%, the sensor fiber having an optical path length which varies in accordance with the change in displacement; and a sleeve for connecting the second end of the lead fiber to the second end of the sensor fiber so as to leave a gap between the partially reflective surfaces of the first and second ferrules, the gap being adjusted between 25–200 microns to provide an optimal light signal to the instrument such that the light returned to the instrument by all reflecting elements is of equal intensity to maximize an interferometric signal.

2. The fiber optic sensor of claim 1, wherein the sensor fiber is configured with at least one optical path length and a configuration for measuring at least one said change in displacement.

3. The fiber optic sensor of claim 2, wherein the sensor fiber has a length of less than 10 cm.

4. The fiber optic sensor of claim 2, wherein the sensor fiber has a length of greater than 100 m.

5. The fiber optic sensor of claim 2, comprising a plurality of the sensor fibers, wherein the connector connects the second end of the lead fiber to the first end of each of the plurality of the sensor fibers in parallel.

6. The fiber optic sensor of claim 5, wherein the connector connects the second end of the lead fiber to the first end of each of the plurality of the sensor fibers at a single location on the lead fiber.

7. The fiber optic sensor of claim 6, wherein the plurality of sensor fibers have different optical path lengths.

8. The fiber optic sensor of claim 2, further comprising a plurality of additional sensor fibers connected to the lead fiber at locations between the first and second ends of the lead fiber.

9. The fiber optic sensor of claim 2, wherein the at least one change in displacement is due to pre-buckling, buckling, cracks, leaks, or creep.

* * * * *